Figure 1:
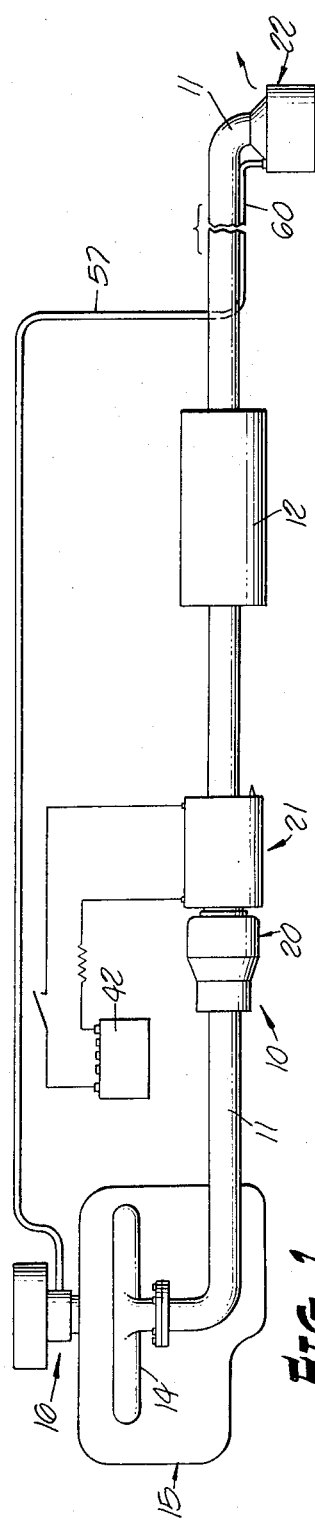

United States Patent
Eknayan

[15] 3,672,171
[45] June 27, 1972

[54] APPARATUS AND METHOD FOR TREATING ENGINE EXHAUST PRODUCTS TO MINIMIZE HARMFUL CONSTITUENTS

[72] Inventor: Hrant Eknayan, 7528 Columbia Street, Rosemead, Calif. 91770

[22] Filed: Feb. 5, 1970

[21] Appl. No.: 8,931

[52] U.S. Cl. ..............................60/274, 23/2 E, 23/277 C, 23/288 F, 60/279, 60/297, 60/303, 123/119 A
[51] Int. Cl.................F01n 3/14, F02b 75/10, F02m 25/06
[58] Field of Search ......................60/29, 30, 30 L, 274, 279, 60/297, 303; 23/2 E, 288 F, 277 C; 123/119 A

[56] References Cited

UNITED STATES PATENTS

| | | | |
|---|---|---|---|
| 2,004,865 | 6/1935 | Grison | 60/30 |
| 2,947,600 | 8/1960 | Clayton | 60/30 |
| 2,981,057 | 4/1961 | Buttler | 60/29 |
| 3,032,968 | 5/1962 | Novak | 60/30 L |
| 3,083,524 | 4/1963 | Dosie | 60/29 |
| 3,239,317 | 3/1966 | Rhodes | 60/29 |
| 3,340,859 | 9/1967 | Williamson | 60/29 |
| 3,457,723 | 7/1969 | Kerns | 60/29 |
| 3,471,265 | 10/1969 | Ciapetta | 60/30 |

FOREIGN PATENTS OR APPLICATIONS

| | | | |
|---|---|---|---|
| 270,541 | 5/1927 | Great Britain | 60/30 |
| 631,368 | 6/1936 | Germany | 60/30 |

*Primary Examiner*—Douglas Hart
*Attorney*—Sellers and Brace

[57] ABSTRACT

A method and accessory for treating engine exhaust products to minimize if not eliminate harmful pollutants present therein as the exhaust products pass through an engine exhaust pipe. The hot exhaust products are exposed to charcoal, copper and heat in the presence of fresh air to combust incompletely burned products and to decompose and absorb nitrogen compounds. Thereafter, the hot exhaust products are exposed to water where remaining traces of nitrogen compounds are absorbed before the treated exhaust products are wasted into the atmosphere. Vaporized water containing absorbed nitrogen compounds is returned to the carburetor intake in pre-heated condition.

16 Claims, 2 Drawing Figures

PATENTED JUN 27 1972   3,672,171

INVENTOR
HRANT EKNAYAN
BY
ATTORNEYS

APPARATUS AND METHOD FOR TREATING ENGINE EXHAUST PRODUCTS TO MINIMIZE HARMFUL CONSTITUENTS

This invention relates to a method and apparatus for treating engine exhaust products and more particularly to an improved method and accessory installable in engine exhaust pipes and operating to convert most if not all of the harmful constituents present therein to a substantially harmless form.

It is well known that the exhaust products given off by an internal combustion engine and particularly those operating along the highways contain constituents harmful to plant and animal life. These harmful constituents include CO, $N_2O$, NO, $NO_2$, $H_2$, and unburned hydrocarbons. Various proposals have been made heretofore for treating exhaust products with a view to the elimination of harmful compounds from exhaust fumes discharging into the atmosphere. Despite the effort of many workers to this end and the expenditures of large sums the proposals made heretofore are not fully satisfactory in important respects including simplicity, reliability, effectiveness, acceptable original and maintenance costs, etc.

It is therefore a principal purpose of the present invention to provide simple, light-weight compact components readily installable on either existing or new engine exhaust systems which are free of moving parts, and highly effective and efficient in treating engine exhaust products to convert and to eliminate harmful constituents normally present therein as these products pass through the exhaust pipe to the atmosphere. The invention accessories function without increasing the back pressure on the engine exhaust manifold or altering the normal engine operating characteristics in any significant degree. These desirable objectives are achieved using inexpensive commonly-available materials and functioning to utilize extra air and supplemental heat if necessary to initiate and maintain a desirable environment in an after burner chamber.

Exhaust components containing nitrogen in various forms and combinations have long been recognized as particularly difficult to treat and to convert to an innocuous products. It has been discovered that the desired conversion of nitrogen compounds can be accomplished simply and effectively in the presence of charcoal, water and copper, particularly in the presence of heated oxygen. In an initial stage of the operation the nitrogen compounds mix with heated oxygen of the air entering the exhaust pipe and then pass over small pellets of charcoal in the presence of copper, such as fine copper wire and copper powder, with the result that nitric oxide is converted to $NO_2$. Thereafter, the exhaust products pass through an after burner maintained at a temperature in the range of 800°–1,200° F. Further, desirably conversion of objectionable exhaust products occurs in this chamber with the oxidation and combustion of unburned and incompletely burned hydrocarbons.

Thereafter, the hot products pass through the usual muffler and into contact with a body of water located in a baffled receptacle at the end of the exhaust pipe. There absorption and solution of remaining traces of nitrogen-carrying constituents is effected along with the condensation of water and other vapors having similar dew points as water vapor. The residue harmless exhaust products are then wasted to the atmosphere. Some of the constituents dissolved in the body of water are continuously removed utilizing wicking the upper end of which embraces the perforated end of a conduit leading back to the carburetor intake and in heat exchange with a source of heat, such as the exhaust pipe. The water is thereby maintained at a desirable operating level by continuously vaporizing portions thereof and returning the vapor into the engine where it is converted to a harmless condition either in the engine cylinders or subsequently while passing through the invention accessory.

It is therefore a primary object of the present invention to provide a new and improved method and apparatus for treating engine exhaust products to convert harmful constituents to a harmless form before wasting the same to the atmosphere.

Another object of the invention is the provision of a simply-constructed low-cost highly efficient accessory installable in an engine exhaust pipe and operating automatically to convert harmful constituents of exhaust products to a harmless form.

Another object of the invention is the provision of an after burner unit for engine exhaust products in combination with an accessory for treating nitrogen compounds in gases issuing from an engine exhaust manifold.

Another object of the invention is the provision of means for passing engine exhaust products in contact with water to dissolve nitrogen constituents therefrom and for returning the water with dissolved nitrogen products into a combustion mixture entering an engine thereby to convert the nitrogen products to an innocuous form.

These and other more specific objects will appear upon reading the following specification and claims and upon considering in connection therewith the attached drawing to which they relate.

Figure 2:
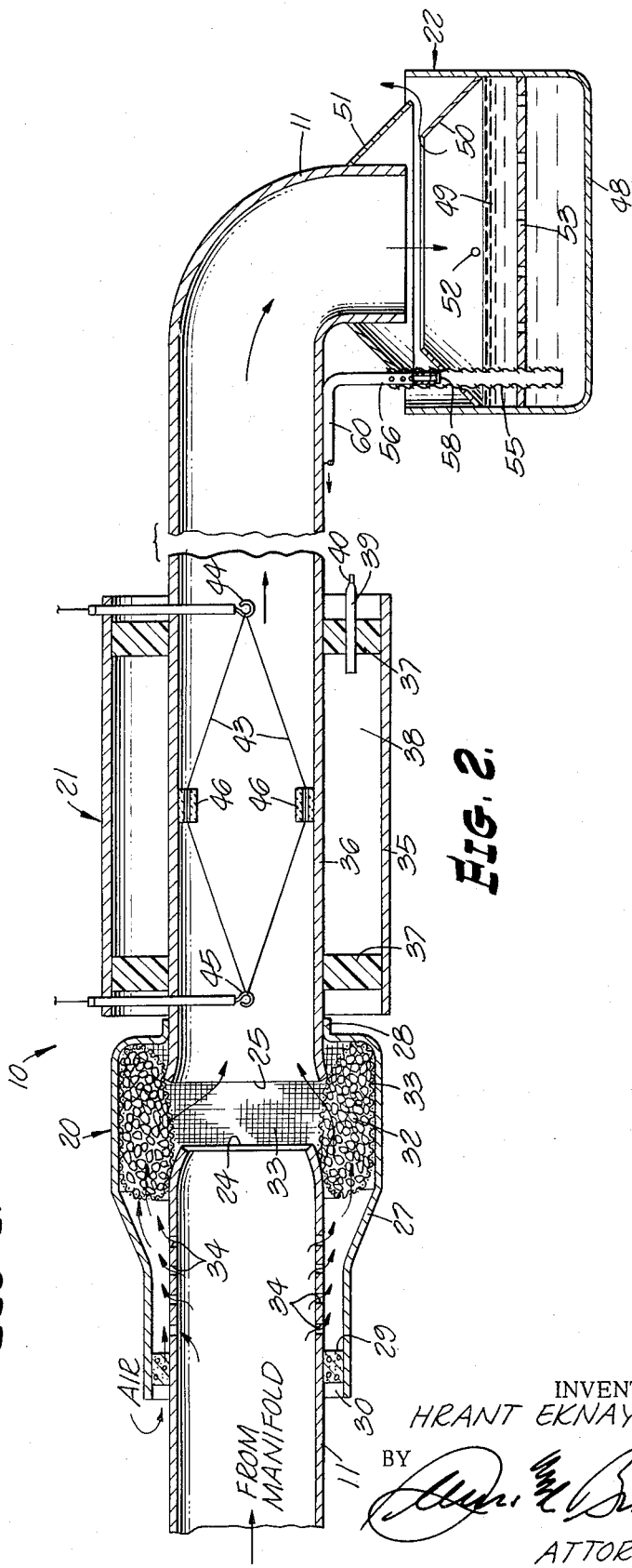

Referring now to the drawing in which a preferred embodiment of the invention is illustrated:

FIG. 1 is a generally schematic view of a preferred embodiment of the invention installed in the exhaust pipe of an internal combustion engine; and FIG. 2 is a cross sectional view on an enlarged scale through the active components of the invention accessory.

Referring initially and more particularly to Figure 2, there is shown an illustrative embodiment of the invention exhaust products treating equipment, designated generally 10, portions of which are installed in engine exhaust pipe 11 to either side of the usual muffler 12. The inlet end of exhaust pipe 11 communicates with the exhaust manifold 14 of an internal combustion engine 15 equipped with a suitable carburetor indicated generally at 16. The accessories for treating the exhaust products include a chamber 20 containing charcoal and copper, an after burner assembly 21, and a gas absorber 22 through which the exhaust gases pass before being wasted into the atmosphere.

It will be understood that sub-assemblies 20, 21, 22 are preferably provided with suitable coupling means, not shown, but of any convenient construction by which these subassemblies can be readily installed in an exhaust pipe assembly. In the event the invention components are installed on new equipment such junction fittings may be dispensed with although they are desirable in all cases in the interest of facilitating detachment for inspection, servicing and replacement.

Sub-assembly 20, 21 is provided with an annular gap in the exhaust pipe between the slightly converging end 24 and the slightly outwardly flaring end 25 of a section of the exhaust pipe. The converging end 24 of the exhaust pipe operates as a venturi throat through which exhaust products from the engine pass at increased velocity effective to produce a low pressure zone surrounding the annular gap between ends 24, 25. This low pressure zone is enclosed by tubular housing 27 the forward end 28 of which is suitably secured to the exhaust pipe. Its rear end is supported concentrically of and spaced outwardly from exhaust pipe 11 suitable radial spacer fins 29 to provide an inlet passage 30 for oxygen-bearing fresh air. The bulbous forward end of the housing 27 encloses a charge of charcoal pellets 32 enclosed in a fine copper wire mesh bag 33. Desirably, charcoal 32 is impregnated with finely divided copper powder. Exhaust pipe 11 is provided with a series of openings 34 through which portions of the exhaust products pass and intermix with air entering inlet 30. A flow of the air entering inlet 30 and the exhaust gases flowing outwardly through openings 34 is entrained by the low pressure zone existing in the chamber charged with charcoal which low pressure is created by the rapidly flowing products passing through the throat of the venturi, as described above. As will be readily apparent from the foregoing, the fresh air entering inlet 30 is pre-heated both by the hot products entering from ports 34 and by passing in heat exchange with the hot exterior of the exhaust pipe 11. Likewise, the copper bag and its charcoal contents are pre-heated both by the products passing thereover and by radiation from the hot products passing along the gap in the exhaust pipe. Under these operating conditions, the charcoal and the copper and heat are highly effective catalytically and otherwise in converting nitrogen monoxide to nitrogen dioxide.

After burner 21 comprises an outer tubular shell 35 having its opposite ends sealed to the central tube 36 by gas-tight end rings 37 preferably formed of ceramic or other suitable poor heat conductive material. Chamber 38 between the end seals is evacuated by the aid of tube 39 following which its outer end 40 is sealed closed thereby providing a high efficiency insulated enclosure for the after burner. It is desirable that the space enclosed by the inner tube 36 of the after burner operate at a temperature ranging between 800° and 1,200° F. Under some operating conditions the heat released in the combustion and oxidation occurring within the after burner unit is adequate to maintain this temperature. However, under cold weather operating conditions and certain other adverse conditions, auxiliary heat is desirable. Such heat may be provided from a suitable source of power, such as the battery 42, connected in circuit with electrical heater wires 43 supported longitudinally of the interior of the after burner between the insulated electrodes 44,45. Intermediate portions of the heaters may be restrained against movement by insulators 46 suitably secured to tube 36.

The discharge end of exhaust pipe 11 is preferably provided with the absorber sub-assembly 22 here shown as having a cup-shaped container 48 suitably supported from and below the downturned end of exhaust pipe 11. The exhaust products discharging from pipe 11 pass downwardly and in contact with a body of water 49 and then between the overlapping edges of a plurality of frusto-conical baffles 50, 51 before passing into the atmosphere. The liquid level in container 48 may be limited by an overflow port 52 and the water may be restrained against surging by a perforated baffle 53.

In passing in contact with the water, the exhaust gases agitate the surface of the water and certain constituents react with or are absorbed or dissolved by the water while other constituents condense and precipitate out onto the water. In particular, certain nitrogen constituents particularly $NO_2$ and $N_2O_4$, react with the water and are held captive therein.

Disposal of some excess water and absorbed constituents from the exhaust products is preferably accomplished by returning the same into the engine cylinders where these products are subjected to high pressure and heat with beneficial and desirable results. A simple means for returning the objectionable liquids to the engine comprises tubular wicking 55 embracing the downturned perforated end 56 of conduit 57, the lower end of which may be closed by a plug 58. An intermediate length of conduit 57 is preferably in heat exchange contact with the exhaust pipe, as is indicated at 60, the remote end of conduit 57 communicating with the air intake of carburetor assembly 16. It will therefore by appreciated that the low pressure normally existing in the carburetor intake facilitates the vaporization of the moisture from the upper end of wicking 55 with the result that vapor therefrom passes through the perforated end 56 of the pipe and is conveyed into the carburetor in preheated condition.

It is found in normal practice that much of the water vapor commonly present in the exhaust products condenses and precipitates in sub-assembly 22 to provide a constantly renewed supply of water for this auxiliary. It is likewise found that wicking 55 and pipe 57 cooperate with the carburetor assembly 16 in returning water vapor and absorbed constituents back to the engine. Any excess water which may accumulate at times overflows through port 52 and discharges onto the highway.

The operation of the described accessory will be readily apparent from the foregoing detailed description of the components and their functional and operational relationship to one another. The objectionable nitrogen-bearing constituents of exhaust gases are converted partly in the catalytic chamber 20, partly in after burner 21, and partly in absorber 22. The oxidation of nitric oxide is facilitated by the preheated oxygen entering through inlet 30 and additionally by the catalytic effect of preheated oxygen, copper and charcoal thereon. Further conversion of nitric oxide occurs in the presence of combustion and oxidation occurring in the very hot afterburner 21. This chamber is also most effective in oxidizing and completing the combustion of unburned and incompletely burned hydrocarbons present in the exhaust products.

Finally, harmful constituents still present in the gases either react with water or are dissolved in water and separated from the exhaust products while passing through absorber unit 22. Additionally, constituents reaching the dew point while passing through the absorber condense and precipitate into the body of water. These products along with the water are vaporized by the low pressure conditions existing within the inlet end of conduit 57 and are drawn back into the carburetor inlet by the engine intake suction pressure.

While the particular apparatus and method for treating engine exhaust products to minimize harmful constituents herein shown and disclosed in detain is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. Apparatus for treating air pollutants in engine exhaust products comprising: a tubular accessory adapted to be inserted in and form a part of an engine exhaust pipe downstream from an exhaust manifold, said accessory having a main passage therethrough for exhaust products, a chamber embracing said main passage containing charcoal and copper and having inlet means for receiving exhaust products entering the inlet end of said main passage and outlet means opening back into said main passage downstream from the inlet end thereof and so arranged relative to the main stream of exhaust products that said main stream is effective to entrain a flow of exhaust products past the charcoal and copper in said chamber, and electrically energized heater means located in the path of exhaust products after at least portions thereof have passed through said charcoal charged chamber.

2. Apparatus as defined in claim 1 characterized in the provision of conduit means for supplying heated air to said charcoal-charged chamber to provide oxygen useful in facilitating the conversion of air pollutants to another form.

3. Apparatus as defined in claim 1 characterized in the provision of an evacuated chamber surrounding the portion of said main passage housing said heater means.

4. Apparatus as defined in claim 1 characterized in the provision of a copper mesh container housed within said chamber and enclosing said charcoal.

5. Apparatus as defined in claim 4 characterized in that said charcoal is in pellet form and impregnated with finely divided copper.

6. Apparatus as defined in claim 1 characterized in that said heater means comprises electrically energized resistance means supported lengthwise of said main passage for exhaust products and including terminals mounted in insulated supports accessible from the exterior of said accessory and adapted to be connected to a source of electrical energy.

7. Apparatus as defined in claim 6 characterized in that said heater means has a capacity adequate to maintain the downstream portion of said main passage at a temperature in the range of 800° to 1,200° F.

8. Apparatus as defined in claim 1 characterized in the provision of means for passing exhaust products discharging from said main passage in contact with a body of water.

9. Apparatus as defined in claim 8 characterized in that said last mentioned means includes wicking having its lower end submerged in said water and its upper end embracing the perforated end of a conduit the remote end of which is adapted to open into the air inlet passage of a carburetor supplying fuel and air to an engine.

10. Apparatus as defined in claim 9 characterized in that a portion of said conduit is in heat exchange with hot exhaust products.

11. Apparatus as defined in claim 8 characterized in that said means for passing exhaust products in contact with water comprises an upright container formed to retain water in the lower end thereof to a selected depth, baffle means in the upper portion of said container for receiving exhaust products and passing the same over the surface of the water in the lower portion thereof before permitting the same to discharge to the atmosphere.

12. Apparatus as defined in claim 11 characterized in the provision of baffle means crosswise of the lower portion of said container to restrain surging of the water when said accessory is subjected to jolts and sudden changes in movement.

13. That method of operating an internal combustion engine which comprises treating the engine exhaust products to facilitate the combustion of unburned constituents and the conversion of air pollutants to desired forms by bypassing a portion of the hot exhaust products from the engine exhaust manifold in intimate contact with copper and with charcoal, adding preheated air to said exhaust products to assure the presence therein of heated oxygen, and electrically heating said mixture of air and exhaust products to a temperature of at least 800° F. to promote the combustion of unburned hydrocarbons and the conversion of nitric oxide to nitrogen dioxide.

14. That method defined in claim 13 which includes the step of passing the exhaust products over the surface of water before wasting them into the atmosphere.

15. That method defined in claim 14 which includes the steps of vaporizing water in contact with which the exhaust products have passed, and feeding said vaporized water into air being mixed with fuel to drive an engine.

16. That method defined in claim 15 characterized in the step of preheating said vaporized water by passing the same in heat exchange with said hot exhaust products.

* * * * *